United States Patent
Li et al.

(10) Patent No.: US 9,538,477 B2
(45) Date of Patent: Jan. 3, 2017

(54) UPLINK POWER CONTROL METHOD, TERMINAL AND BASE STATION

(71) Applicant: ZTE CORPORATION, Shenzhen, Guangdong Province (CN)

(72) Inventors: Weimin Li, Shenzhen (CN); Yu Ngok Li, Shenzhen (CN); Lu Ren, Shenzhen (CN); Peng Hao, Shenzhen (CN); Wenfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/397,658

(22) PCT Filed: Jul. 23, 2013

(86) PCT No.: PCT/CN2013/079862
§ 371 (c)(1),
(2) Date: Oct. 29, 2014

(87) PCT Pub. No.: WO2013/185672
PCT Pub. Date: Dec. 19, 2013

(65) Prior Publication Data
US 2015/0133179 A1    May 14, 2015

(30) Foreign Application Priority Data

Jul. 25, 2012  (CN) .......................... 2012 1 0259715
Nov. 15, 2012  (CN) .......................... 2012 1 0460538

(51) Int. Cl.
H04B 7/00    (2006.01)
H04W 52/14   (2009.01)
(Continued)

(52) U.S. Cl.
CPC ........... *H04W 52/146* (2013.01); *H04W 52/10* (2013.01); *H04W 52/221* (2013.01); *H04W 52/242* (2013.01)

(58) Field of Classification Search
None
See application file for complete search history.

(56) References Cited

U.S. PATENT DOCUMENTS

2013/0114562 A1    5/2013  Seo et al.

FOREIGN PATENT DOCUMENTS

CN    101309096 A    11/2008
CN    101998605 A    3/2011
(Continued)

*Primary Examiner* — Dominic Rego
(74) *Attorney, Agent, or Firm* — Ling Wu; Stephen Yang; Ling and Yang Intellectual Property (57) ABSTRACT

The embodiments of the present invention disclose an uplink power control method, a terminal and a base station, which can adjust or determine uplink transmission power of a terminal on subframes which belong to different subframe groups respectively. The method includes: a base station determining subframe group information, the subframe group information being used by a terminal to determine uplink transmission power adjustment amounts on subframes which belong to different subframe groups; and the base station transmitting the subframe group information to the terminal. A terminal determines uplink transmission power adjustment amounts on subframes which belong to different subframe groups, and determines uplink transmission power on corresponding subframes according to the determined uplink transmission power adjustment amounts on the subframes which belong to the different subframe groups.

20 Claims, 2 Drawing Sheets

(51) Int. Cl.
*H04W 52/10* (2009.01)
*H04W 52/22* (2009.01)
*H04W 52/24* (2009.01)

(56) References Cited

FOREIGN PATENT DOCUMENTS

| CN | 102149099 A | 8/2011 |
| EP | 2536198 A1 | 12/2012 |
| WO | 2011097878 A1 | 8/2011 |
| WO | 2012008773 A2 | 1/2012 |

UPLINK POWER CONTROL METHOD, TERMINAL AND BASE STATION

TECHNICAL FIELD

The present document relates to the field of communications, and in particular, to an uplink power control method, terminal and base station.

BACKGROUND

The uplink-downlink configuration mode of Time Division Duplex (TDD for short) mode of the Long Term Evolution (LTE for short) system is as shown in table 1, wherein, D represents that the subframe is used for downlink transmission, U represents that the subframe is used for uplink transmission, S represents a special subframe and includes three special slots, i.e., a Downlink Pilot Time Slot (DwPTS for short, which is used for downlink transmission), a Guard Period (GP for short), and an Uplink Pilot Time Slot (UpPTS for short, which is used for uplink transmission). In the current actual system, the indexes of the uplink-downlink configuration will be notified to the terminal through a broadcast message.

TABLE 1

Schematic table of uplink-downlink configuration

| Config-urations | Transition Point periods | Subframe numbers | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

According to table 1, in the LTE-TDD system, when the TDD uplink-downlink configuration modes of different cells are the same, the uplink transmission implemented by the terminal of one cell is subjected to uplink interferences generated by uplink transmission implemented by the terminals of other cells, while when the TDD uplink-downlink configuration modes of different cells are different, the uplink transmission implemented by the terminal of one cell may be subjected to uplink interferences generated by uplink transmission implemented by the other uplink cell terminals, or may also be subjected to downlink interference generated by downlink transmission implemented by the other downlink cell base stations. Compared with the transmission power of the terminal, the transmission power of the base station is higher, and the downlink interferences generated by the downlink transmission implemented by the downlink cell base station is also relatively high, which will result in severe deterioration of the performance of the uplink transmission terminal, and even cause the terminal unable to implement communication.

At present, when the LTE terminal performs uplink transmission, the LTE terminal calculates the uplink transmission power according to the uplink open-loop power control parameter configured by the base station, and adjusts the uplink transmission power according to the uplink Transmit Power Control (TPC for short) command configured by the base station. Wherein, the base station transmits the uplink open-loop power control parameter to the terminal through Radio Resource Control (RRC) signaling; and the base station transmits the TPC command to the terminal through Downlink Control Information (DCI for short) in the Physical Downlink Control Channel (PDCCH for short), and the terminal acquires an adjustment value corresponding to the TPC command by decoding the DCI.

When uplink transmission is implemented in a certain cell and other base stations in a certain region surrounding the cell base station also implement uplink transmission, interferences to which the terminal in the cell is subjected when implementing uplink transmission is relatively small and varies a little, the adjustment of the uplink transmission power by the terminal according to the TPC command configured by the base station in accordance with the power adjustment mechanism in the related art can maintain the Signal to Interference and Noise Ratio (SINR for short) of the uplink transmission of the terminal at a certain level and satisfy the uplink transmission requirements thereof. When uplink transmission is implemented in a certain cell and other base stations in a certain region surrounding the cell base station implement downlink transmission, interferences to which the terminal in the cell is subjected when implementing uplink transmission becomes significantly large and also varies a lot. If the uplink transmission power continues to be adjusted by the terminal according to the TPC command configured by the base station in accordance with the power adjustment mechanism in the related art, it can not ensure SINR requirements of the uplink transmission thereof, thereby influencing the uplink transmission performance of the terminal and the system. That is, the use of the power adjustment mechanism in the related art by the terminal can not ensure that it adjusts the uplink transmission power on the uplink subframe to a relatively suitable power value, and thus can not ensure the uplink transmission performance of the terminal and the system.

SUMMARY

The embodiments of the present document disclose an uplink power control method, a terminal and a base station, which can adjust or determine uplink transmission power of a terminal on subframes which belong to different subframe groups respectively.

The embodiments of the present document provide an uplink power control method, comprising:

a terminal determining uplink transmission power adjustment amounts on subframes which belong to different subframe groups respectively, and the terminal determining uplink transmission power on corresponding subframes according to the determined uplink transmission power adjustment amounts on the subframes which belong to the different subframe groups.

Preferably, the subframe groups at least include a first subframe group and a second subframe group, wherein the first subframe group includes a subframe which is configured as an uplink transmission subframe by a base station and is also configured as an uplink transmission subframe by another base station whose distance from the base station is less than a preset value, and the second subframe group includes a subframe which is configured as an uplink transmission subframe by the base station and is also configured as a downlink transmission subframe by another base station whose distance from the base station is less than a preset value, or the first subframe group includes an uplink subframe which is subjected to interferences less than a preset threshold from other cells, and the second subframe group includes an uplink subframe which is subjected to interferences larger than a preset threshold from other cells.

Preferably, the terminal determining uplink transmission power adjustment amounts on the subframes which belong to the different subframe groups comprises:

the terminal receiving power adjustment signaling transmitted by a base station, and determining the uplink transmission power adjustment amounts on the subframes which belong to the different subframe groups according to adjustment values corresponding to the power adjustment signaling and the subframe group information; wherein the power adjustment signaling transmitted by the base station includes uplink transmit power control (TPC) command.

Preferably, the adjustment values corresponding to the power adjustment signaling are accumulative adjustment values, and the terminal determining the uplink transmission power adjustment amounts on the subframes which belong to the different subframe groups according to adjustment values corresponding to the power adjustment signaling and subframe group information comprises:

the terminal determining that the uplink transmission power adjustment amount on a subframe is a sum of the uplink transmission power adjustment amount of the terminal on the latest subframe which is prior to the subframe and belongs to the same subframe group as that of the subframe and the accumulative adjustment value corresponding to the power adjustment signaling, i.e., $$f_N(k)=f_N(i)+\delta \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i, and $\delta$ represents the accumulative adjustment value corresponding to power adjustment signaling for the subframe k transmitted by the base station and received by the terminal.

Preferably, the adjustment values corresponding to the power adjustment signaling are absolute adjustment values, and the terminal determining the uplink transmission power adjustment amounts on the subframes which belong to the different subframe groups according to the adjustment values corresponding to the power adjustment signaling and subframe group information comprises:

the terminal determining that the uplink transmission power adjustment amount on a subframe is the absolute adjustment value corresponding to the power adjustment signaling, i.e., $$f_N(k)=\delta \text{ [dB]}$$

wherein, k represents the index of a subframe, N represents the index of the subframe group which the subframe k belongs to, the number of subframe groups is larger than or equal to 2, $f_N(k)$ represents the uplink transmission power adjustment amount on the subframe k determined by the terminal, and $\delta$ represents the absolute adjustment value corresponding to power adjustment signaling for the subframe k transmitted by the base station and received by the terminal.

Preferably, the terminal determining uplink transmission power on corresponding subframes according to the determined uplink transmission power adjustment amounts on the subframes which belong to the different subframe groups comprises:

the terminal calculating the uplink transmission power on a subframe according to the following equation:

$$P(k)=10 \log_{10}(M(k))+P_O+\alpha \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M (k) represents the transmission resource bandwidth of the terminal, $P_O$ represents the power parameter configured by the system, $\alpha$ represents the path loss compensation factor configured by the system, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

Preferably, the method further comprises: the terminal receiving subframe group information transmitted by the base station, and determining which subframe group a subframe belongs to according to the subframe group information, wherein the subframe group information includes grouping information of the uplink subframes in one or more radio frames or information about which subframe group one uplink subframe belongs to.

Preferably, the method further comprises: the terminal judging, according to whether the subframe group information transmitted by the base station is received, whether to perform the step of determining uplink transmission power adjustment amounts on subframes which belong to the different subframe groups, or the terminal judging, according to enablement information transmitted by the base station, whether to perform the step of determining uplink transmission power adjustment amounts on subframes which belong to the different subframe groups.

Preferably, before determining the uplink transmission power, the method further comprises: the terminal receiving multiple sets of uplink power control signaling applied to different subframe groups which are transmitted by the base station, each set of uplink power control signaling being applied to one subframe group; and the terminal determining uplink transmission power on corresponding subframes according to the determined uplink transmission power adjustment amounts on the subframes which belong to the different subframe groups comprises: the terminal determining the uplink transmission power of corresponding subframes according to the determined uplink transmission power adjustment amounts in combination with the received uplink power control signaling.

Preferably, each set of uplink power control signaling includes uplink open-loop power control parameters; and the terminal determining the uplink transmission power of corresponding subframes according to the determined uplink transmission power adjustment amounts in combination with the received uplink power control signaling comprises:

the terminal calculating the uplink transmission power on a subframe according to the following equation, i.e., $$P(k)=10 \log_{10}(M(k))+P_{O,N}+\alpha_N \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M (k) represents the transmission resource bandwidth of the terminal, $P_{O,N}$ and $\alpha_N$ are uplink open-loop power control parameters in the uplink power control signaling applied to the subframe group N to which the subframe k belongs, wherein, $P_{O,N}$ represents the power parameter configured by the system applied to the subframe group N, $\alpha_N$ represents the path loss compensation factor configured by the system applied to the subframe group N, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

The embodiments of the present document further provide an uplink power control method, comprising:

a base station determining subframe group information, the subframe group information being used by a terminal to determine uplink transmission power adjustment amounts on subframes which belong to different subframe groups; and the base station transmitting the subframe group information to the terminal.

Preferably, the subframe groups at least include a first subframe group and a second subframe group, and the base station determining subframe group information comprises: the base station determining that a subframe which is configured as an uplink transmission subframe by the base station and is also configured as an uplink transmission subframe by another base station whose distance from the base station is less than a preset value belongs to the first subframe group, and the base station determining that a subframe which is configured as an uplink transmission subframe by the base station and is also configured as a downlink transmission subframe by another base station whose distance from the base station is less than a preset value belongs to the second subframe group; or the base station determining that an uplink subframe which is subjected to interferences less than a preset threshold from other cells belongs to the first subframe group, and the base station determining that an uplink subframe which is subjected to interferences larger than a preset threshold from other cells belongs to the second subframe group;

the subframe group information includes grouping information of the uplink subframes in one or more radio frames or information about which subframe group one uplink subframe belongs to.

Preferably, the subframe group information is further used by the terminal to judge whether to determine uplink transmission power adjustment amounts on subframes which belong to the different subframe groups.

Preferably, the method further comprises: the base station configuring enablement information, and transmitting the enablement information to the terminal, the enablement information being used by the terminal to judge whether to determine uplink transmission power adjustment amounts on subframes which belong to the different subframe groups.

Preferably, the method further comprises: the base station configuring multiple sets of uplink power control signaling applied to different subframe groups, each set of uplink power control signaling being applied to one subframe group; and the base station transmitting the multiple sets of uplink power control signaling applied to the different subframe groups to the terminal.

Preferably, each set of uplink power control signaling includes uplink open-loop power control parameters, and the uplink open-loop power control parameters are used by the terminal to calculate the uplink transmission power of the terminal on the subframe, and the subframe is a subframe in the subframe group to which the uplink power control signaling is applied.

The embodiments of the present document further provide a terminal for implementing uplink power control, comprising a power adjustment amount determination module and a transmission power determination module, wherein, the power adjustment amount determination module is configured to determine uplink transmission power adjustment amounts on subframes which belong to different subframe groups respectively, and the transmission power determination module is configured to determine uplink transmission power on corresponding subframes according to the uplink transmission power adjustment amounts on the subframes which belong to the different subframe groups determined by the power adjustment amount determination module.

Preferably, the subframe groups at least include a first subframe group and a second subframe group, wherein the first subframe group includes a subframe which is configured as an uplink transmission subframe by a base station and is also configured as an uplink transmission subframe by another base station whose distance from the base station is less than a preset value, and the second subframe group includes a subframe which is configured as an uplink transmission subframe by the base station and is also configured as a downlink transmission subframe by another base station whose distance from the base station is less than a preset value, or the first subframe group includes an uplink subframe which is subjected to interferences less than a preset threshold from other cells, and the second subframe group includes an uplink subframe which is subjected to interferences larger than a preset threshold from other cells.

Preferably, the power adjustment amount determination module is configured to determine uplink transmission power adjustment amounts on the subframes which belong to the different subframe groups by:

receiving power adjustment signaling transmitted by a base station, and determining the uplink transmission power adjustment amounts on the subframes which belong to the different subframe groups according to adjustment values corresponding to the power adjustment signaling and the subframe group information; wherein the power adjustment signaling includes uplink transmit power control (TPC) command.

Preferably, the adjustment values corresponding to the power adjustment signaling are accumulative adjustment values, and the power adjustment amount determination module is configured to determine the uplink transmission power adjustment amounts on the subframes which belong to the different subframe groups according to adjustment values corresponding to the power adjustment signaling and subframe group information by:

determining that the uplink transmission power adjustment amount on a subframe is a sum of the uplink transmission power adjustment amount of the terminal on the latest subframe which is prior to the subframe and belongs to the same subframe group as that of the subframe and the accumulative adjustment value corresponding to the power adjustment signaling, i.e., $$f_N(k)=f_N(i)+\delta \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i, and $\delta$ represents the accumulative adjustment value corresponding to power adjustment signaling for the subframe k transmitted by the base station and received by the terminal.

Preferably, the adjustment values corresponding to the power adjustment signaling are absolute adjustment values, and the power adjustment amount determination module is configured to determine the uplink transmission power adjustment amounts on the subframes which belong to the different subframe groups according to the adjustment values corresponding to the power adjustment signaling and subframe group information by:

determining that the uplink transmission power adjustment amount on a subframe is the absolute adjustment value corresponding to the power adjustment signaling, i.e., $$f_N(k)=\delta \text{ [dB]}$$

wherein, k represents the index of a subframe, N represents the index of the subframe group which the subframe k belongs to, the number of subframe groups is larger than or equal to 2, $f_N(k)$ represents the uplink transmission power adjustment amount on the subframe k determined by the terminal, and $\delta$ represents the absolute adjustment value corresponding to power adjustment signaling for the subframe k transmitted by the base station and received by the terminal.

Preferably, the transmission power determination module is configured to calculate the uplink transmission power on a subframe according to the following equation:

$$P(k)=10\log_{10}(M(k))+P_O+\alpha \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M (k) represents the transmission resource bandwidth of the terminal, $P_O$ represents the power parameter configured by the system, $\alpha$ represents the path loss compensation factor configured by the system, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

Preferably, the power adjustment amount determination module is further configured to receive subframe group information transmitted by the base station, and determine which subframe group a subframe belongs to according to the subframe group information, wherein the subframe group information includes grouping information of the uplink subframes in one or more radio frames or information about which subframe group one uplink subframe belongs to.

Preferably, the power adjustment amount determination module is further configured to judge, according to whether the subframe group information transmitted by the base station is received, whether to determine uplink transmission power adjustment amounts on subframes which belong to the different subframe groups, or the power adjustment amount determination module is further configured to judge, according to enablement information transmitted by the base station, whether to determine uplink transmission power adjustment amounts on subframes which belong to the different subframe groups.

Preferably, the terminal further comprises a control signaling reception module, configured to receive multiple sets of uplink power control signaling applied to different subframe groups which are transmitted by the base station, each set of uplink power control signaling being applied to one subframe group; and the transmission power determination module is configured to determine uplink transmission power on corresponding subframes according to the uplink transmission power adjustment amounts on the subframes which belong to the different subframe groups determined by the power adjustment amount determination module by: determining the uplink transmission power of corresponding subframes according to the uplink transmission power adjustment amounts determined by the power adjustment amount determination module in combination with the uplink power control signaling received by the control signaling reception module.

Preferably, each set of uplink power control signaling includes uplink open-loop power control parameters; and the transmission power determination module is configured to calculate the uplink transmission power on a subframe according to the following equation:

$$P(k)=10\log_{10}(M(k))+P_{O,N}+\alpha_N \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M (k) represents the transmission resource bandwidth of the terminal, $P_{O,N}$ and $\alpha_N$ are uplink open-loop power control parameters in the uplink power control signaling applied to the subframe group N to which the subframe k belongs, wherein, $P_{O,N}$ represents the power parameter configured by the system applied to the subframe group N, $\alpha_N$ represents the path loss compensation factor configured by the system applied to the subframe group N, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

The embodiments of the present document provide a base station for implementing uplink power control, comprising a subframe group information determination module and a transmission module, wherein, the subframe group information determination module is configured to determine subframe group information, the subframe group information being used by a terminal to determine uplink transmission power adjustment amounts on subframes which belong to different subframe groups; and the transmission module is configured to transmit the subframe group information to the terminal.

Preferably, the subframe groups at least include a first subframe group and a second subframe group, and the subframe group information determination module is configured to determine subframe group information by: determining that a subframe which is configured as an uplink transmission subframe by the base station and is also configured as an uplink transmission subframe by another base station whose distance from the base station is less than a preset value belongs to the first subframe group, and determining that a subframe which is configured as an uplink transmission subframe by the base station and is also configured as a downlink transmission subframe by another base station whose distance from the base station is less than a preset value belongs to the second subframe group; or the subframe group information determination module determines that an uplink subframe which is subjected to interferences less than a preset threshold from other cells belongs to the first subframe group, and the subframe group information determination module determines that an uplink subframe which is subjected to interferences larger than a preset threshold from other cells belongs to the second subframe group;

the subframe group information includes grouping information of the uplink subframes in one or more radio frames or information about which subframe group one uplink subframe belongs to.

Preferably, the subframe group information is further configured to be used by the terminal to judge whether to determine uplink transmission power adjustment amounts on subframes which belong to the different subframe groups.

Preferably, the base station further comprises an enablement information configuration module, configured to configure the enablement information, the enablement information being used by the terminal to judge whether to determine uplink transmission power adjustment amounts on subframes which belong to the different subframe groups;

wherein, the transmission module is further configured to transmit the enablement information to the terminal.

Preferably, the base station further comprises an uplink power control signaling configuration module, configured to configure multiple sets of uplink power control signaling applied to different subframe groups, each set of uplink power control signaling being applied to one subframe group;

wherein, the transmission module is further configured to transmit the multiple sets of uplink power control signaling applied to the different subframe groups to the terminal.

Preferably, each set of uplink power control signaling includes uplink open-loop power control parameters, and the uplink open-loop power control parameters are used by the terminal to calculate the uplink transmission power of the terminal on the subframe, and the subframe is a subframe in the subframe group to which the uplink power control signaling is applied.

The method, terminal and base station of the present embodiments enable the terminal to perform uplink transmission with a suitable uplink transmission power by adjusting or determining uplink transmission power of the terminal on subframes which belong to different subframe groups respectively, which ensures the SINR requirements on the uplink transmission by the terminal on the uplink subframes which belong to different subframe groups as much as possible, thereby ensuring the uplink transmission performance of the terminal and the system.

BRIEF DESCRIPTION OF DRAWINGS

The accompanying drawings described herein are used to provide a better understanding of the present document and constitute a part of this application, and the schematic embodiments of the present document and the descriptions thereof are used to explain the present document and do not constitute an improper definition of the present document. In the accompanying drawings.

PREFERRED EMBODIMENTS OF THE PRESENT DOCUMENT

The embodiments of the present document will be described in further detail hereinafter in conjunction with accompanying drawings. It should be illustrated that without conflict, the embodiments of the present application and the features in the embodiments can be combined with each other randomly.

Embodiment One

Figure 1:
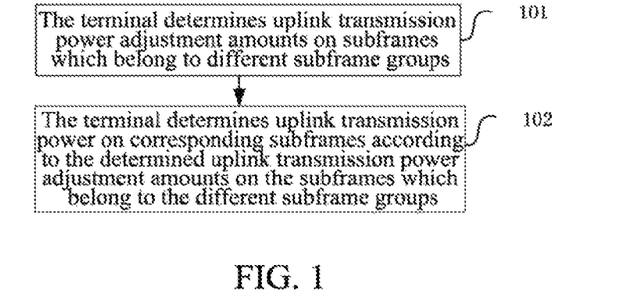
FIG. 1 is a flowchart of a process performed by a terminal according to embodiment one of the present document.

The present embodiment describes a process performed by a terminal in an uplink power control method. As shown in FIG. 1, the process comprises the following steps.

In step 101, the terminal determines uplink transmission power adjustment amounts on subframes which belong to different subframe groups respectively.

The subframe groups at least include a first subframe group and a second subframe group, wherein the first subframe group and the second subframe group can be divided by using the following mode: the first subframe group includes a subframe which is configured as an uplink transmission subframe by a current base station and is also configured as an uplink transmission subframe by another base station whose distance from the current base station is less than a preset value, and the second subframe group includes a subframe which is configured as an uplink transmission subframe by the current base station and is configured as a downlink transmission subframe by another base station whose distance from the current base station is less than a preset value, or the first subframe group includes an uplink subframe which is subjected to interferences less than a preset threshold from other cells, and the second subframe group includes an uplink subframe which is subjected to interferences larger than a preset threshold from other cells.

Preferably, the terminal receives subframe group information transmitted by the base station, wherein the subframe group information includes grouping information of the uplink subframes in one or more radio frames, or information about which subframe group one uplink subframe belongs to; and determines which subframe group the current subframe belongs to according to the subframe group information.

The terminal determining uplink transmission power adjustment amounts on the subframes which belong to the different subframe groups comprises: the terminal receiving power adjustment signaling transmitted by the base station, and determining the uplink transmission power adjustment amounts on the subframes which belong to the different subframe groups according to adjustment values corresponding to the power adjustment signaling and subframe group information;

Preferably, the power adjustment signaling transmitted by the base station includes uplink Transmit Power Control (TPC) command, and the adjustment values corresponding to the power adjustment signaling include accumulative adjustment values or absolute adjustment values;

if the adjustment values corresponding to the power adjustment signaling are accumulative adjustment values, the operation of the terminal determining the uplink transmission power adjustment amounts on the subframes which belong to the different subframe groups according to the adjustment values corresponding to the power adjustment signaling and subframe group information comprises:

the terminal determining that the uplink transmission power adjustment amount on a current subframe is a sum of the uplink transmission power adjustment amount of the terminal on the latest subframe which is prior to the current subframe and belongs to the same subframe group as that of the current subframe and the accumulative adjustment value corresponding to the power adjustment signaling, i.e., $$f_N(k)=f_N(i)+\delta \text{ [dB]}$$

wherein, k represents the index of a current subframe, N represents the index of the subframe group which the subframe k belongs to, the number of subframe groups is larger than or equal to 2, i represents the index of the latest subframe which is prior to the current subframe k and belongs to the subframe group N, $f_N(k)$ represents the uplink transmission power adjustment amount on the current subframe k determined by the terminal, $f_N(i)$ represents the uplink transmission power adjustment amount of the terminal on the subframe i, and δ represents the accumulative adjustment value corresponding to power adjustment signaling for the subframe k transmitted by the base station and received by the terminal.

If the adjustment values corresponding to the power adjustment signaling are absolute adjustment values, the operation of the terminal determining the uplink transmission power adjustment amounts on the subframes which belong to the different subframe groups according to the adjustment values corresponding to the power adjustment signaling and subframe group information comprises:

the terminal determining that the uplink transmission power adjustment amount on the current subframe is the absolute adjustment value corresponding to the power adjustment signaling, i.e., $$f_N(k)=\delta \text{ [dB]}$$

wherein, k represents the index of a current subframe, N represents the index of the subframe group which the subframe k belongs to, the number of subframe groups is larger than or equal to 2, $f_N(k)$ represents the uplink transmission power adjustment amount on the current subframe k determined by the terminal, and δ represents the absolute adjustment value corresponding to power adjustment signaling for the current subframe k transmitted by the base station and received by the terminal.

In a preferable embodiment, the terminal judges, according to whether the subframe group information transmitted by the base station is received, whether to perform the step of determining uplink transmission power adjustment amounts on subframes which belong to the different subframe groups, or the terminal judges, according to the received enablement information transmitted by the base station, whether to perform the step of determining uplink transmission power adjustment amounts on subframes which belong to the different subframe groups. For example, if the value of the enablement information is "1", the terminal needs to determine uplink transmission power adjustment amounts on subframes which belong to different subframe groups, and if the value of the enablement information is not "1", the terminal needs not to determine uplink transmission power adjustment amounts on subframes which belong to different subframe groups.

Wherein, whether a terminal determines uplink transmission power adjustment amounts on subframes which belong to different subframe groups refers to whether the terminal considers the subframe group information when determining the uplink transmission power adjustment amounts on the subframes.

In step 102, the terminal determines uplink transmission power on corresponding subframes according to the determined uplink transmission power adjustment amounts on the subframes which belong to the different subframe groups.

Preferably, the terminal calculates the uplink transmission power on the current subframe according to the following equation:

$$P(k)=10 \log_{10}(M(k))+P_O+\alpha \cdot PL+\Delta_{TF}(k)+f_N(k) \text{ [dBm]}$$

wherein, k represents the index of a current subframe, N represents the index of the subframe group which the subframe k belongs to, the number of subframe groups is larger than or equal to 2, P(k) represents uplink transmission power of the terminal on the current subframe k, M(k) represents the transmission resource bandwidth of the terminal, $P_O$ represents the power parameter configured by the system, α represents the path loss compensation factor configured by the system, PL represents the downlink path loss estimated by the terminal, $\Delta_{TF}(k)$ represents the transmission compensation amount of the terminal, and $f_N(k)$ represents the uplink transmission power adjustment amount on the current subframe k determined by the terminal.

In a preferable embodiment, before determining the uplink transmission power, the terminal also receives multiple sets of uplink power control signaling applied to different subframe groups which are transmitted by the base station, each set of uplink power control signaling being applied to one subframe group; and the terminal determines the uplink transmission power of corresponding subframes according to the determined uplink transmission power adjustment amounts in combination with the received uplink power control signaling.

Wherein, each set of uplink power control signaling includes uplink open-loop power control parameters, and the uplink open-loop power control parameters are used by the terminal to calculate the uplink transmission power of the terminal on the subframe, and the subframe is a subframe in the subframe group to which the uplink power control signaling is applied.

Then, the operation of the terminal determining the uplink transmission power of corresponding subframes according to the uplink transmission power adjustment amounts in combination with the uplink power control signaling comprises:

When determining the uplink transmission power on the current subframe, the terminal calculating the uplink transmission power on the subframe by using the uplink open-loop power control parameters in the uplink power control signaling which are applied to the subframe group to which the subframe belongs, and adjusting the calculated uplink transmission power using the determined uplink transmission power adjustment amount of the terminal on the subframe, i.e., $$P(k)=10\log_{10}(M(k))+P_{O,N}+\alpha_N \cdot PL+\Delta_{TF}(k)+f_N(k)$$
[dBm]

wherein, k represents the index of a current subframe, N represents the index of the subframe group which the subframe k belongs to, the number of subframe groups is larger than or equal to 2, P(k) represents uplink transmission power of the terminal on the current subframe k, M (k) represents the transmission resource bandwidth of the terminal, $P_{O,N}$ and $\alpha_N$ are uplink open-loop power control parameters in the uplink power control signaling applied to the subframe group N to which the current subframe k belongs, wherein, $P_{O,N}$ represents the power parameter configured by the system applied to the subframe group N, $\alpha_N$ represents the path loss compensation factor configured by the system applied to the subframe group N, PL represents the downlink path loss estimated by the terminal, $\Delta_{TF}$ (k) represents the transmission compensation amount of the terminal, and $f_N(k)$ represents the uplink transmission power adjustment amount on the current subframe k determined by the terminal.

Figure 2:
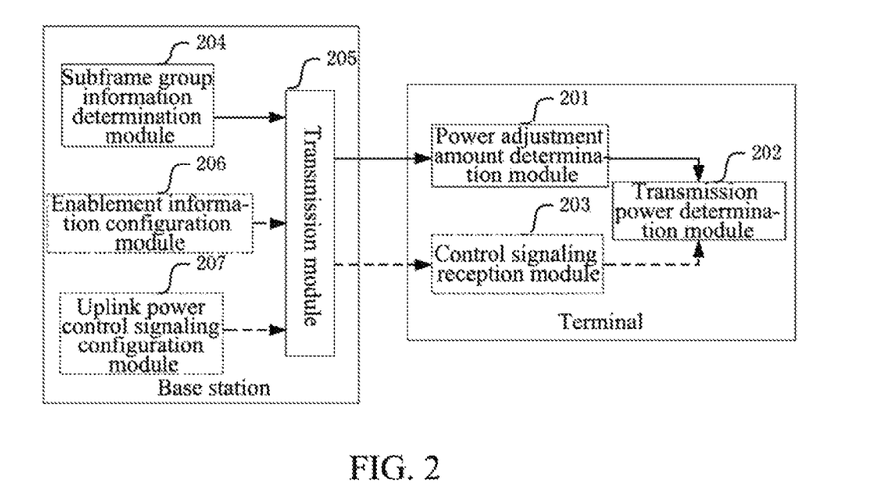
FIG. 2 is a structural diagram of an uplink power control system comprising a terminal and a base station according to embodiment one and embodiment two of the present document.

A terminal which performs the above uplink power control method, as shown in FIG. 2, comprises a power adjustment amount determination module 201 and a transmission power determination module 202, wherein, the power adjustment amount determination module 201 is configured to determine uplink transmission power adjustment amounts on subframes which belong to different subframe groups, and the transmission power determination module 202 is configured to determine uplink transmission power on corresponding subframes according to the uplink transmission power adjustment amounts on the subframes which belong to the different subframe groups determined by the power adjustment amount determination module.

The grouping method of the subframe groups is described as above, and the description thereof will be omitted here.

How the power adjustment amount determination module 201 determines the uplink transmission power adjustment amounts on the subframes which belong to the different subframe groups and how the transmission power determination module 202 determines uplink transmission power on corresponding subframes are described as above, and the description thereof will be omitted here.

The power adjustment amount determination module 201 is further configured to receive subframe group information transmitted by the base station, and determine which subframe group a subframe belongs to according to the subframe group information, wherein the subframe group information includes grouping information of the uplink subframes in one or more radio frames or information about which subframe group an uplink subframe belongs to.

In a preferable embodiment, the power adjustment amount determination module 201 is further configured to judge, according to whether the subframe group information transmitted by the base station is received, whether to determine uplink transmission power adjustment amounts on subframes which belong to the different subframe groups, or judge, according to enablement information transmitted by the base station, whether to determine uplink transmission power adjustment amounts on subframes which belong to the different subframe groups.

In a preferable embodiment, the terminal further comprises a control signaling reception module 203, configured to receive multiple sets of uplink power control signaling applied to different subframe groups which are transmitted by the base station, each set of uplink power control signaling being applied to one subframe group; and the transmission power determination module 202 is configured to determine the uplink transmission power of corresponding subframes according to the uplink transmission power adjustment amounts determined by the power adjustment amount determination module 201 in combination with the uplink power control signaling received by the control signaling reception module 203.

Preferably, each set of uplink power control signaling includes uplink open-loop power control parameters; and the uplink open-loop power control parameters are used by the transmission power determination module 202 to calculate the uplink transmission power of the terminal on the subframe, wherein the subframe is a subframe in the subframe group to which the uplink power control signaling is applied;

Preferably, the specific operation of the transmission power determination module 202 determining the uplink transmission power of corresponding subframes according to the uplink transmission power adjustment amounts determined by the power adjustment amount determination module 201 in combination with the uplink power control signaling received by the control signaling reception module 203 is described as above, and the description thereof will be omitted here.

Embodiment Two

Figure 3:
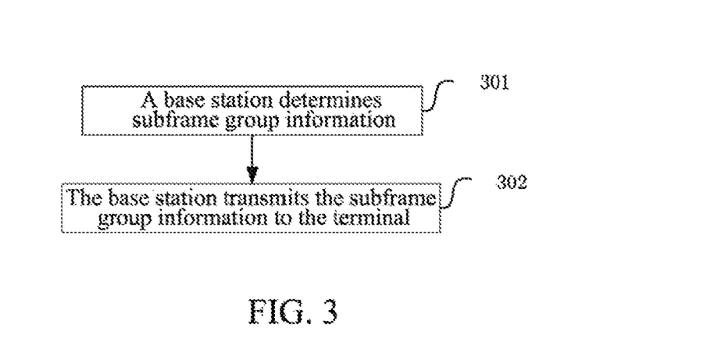
FIG. 3 is a flowchart of a process performed by the base station according to embodiment two of the present document.

The present embodiment describes a process performed by a base station in an uplink power control method. As shown in FIG. 3, the process comprises the following steps.

In step 301, a base station determines subframe group information.

The above subframe group information is used by a terminal to determine uplink transmission power adjustment amounts on subframes which belong to different subframe groups; and the above subframe groups at least include a first subframe group and a second subframe group, wherein the base station can determine the first subframe group and the second subframe group in the following way: the base station determining that a subframe which is configured as an uplink transmission subframe by the base station and is also configured as an uplink transmission subframe by another base station whose distance from the base station is less than a preset value belongs to the first subframe group, and the base station determining that a subframe which is configured as an uplink transmission subframe by the base station and is also configured as a downlink transmission subframe by another base station whose distance from the base station is less than a preset value belongs to the second subframe group; or the base station determining that an uplink subframe which is subjected to interferences less than a preset threshold from other cells belongs to the first subframe group, and the base station determining that an uplink subframe which is subjected to interferences larger than a preset threshold from other cells belongs to the second subframe group.

In step 302, the base station transmits the subframe group information to the terminal.

The subframe group information may be grouping information of the uplink subframes in one or more radio frames or information about which subframe group one uplink subframe belongs to.

In a preferable embodiment, the above subframe group information is further used by the terminal to judge whether to determine uplink transmission power adjustment amounts on subframes which belong to the different subframe groups.

In a preferable embodiment, the above base station further configures enablement information, and transmits the enablement information to the terminal; and the enablement information is used by the terminal to judge whether to determine uplink transmission power adjustment amounts on subframes which belong to the different subframe groups. For example, the base station configures the enablement information through RRC signaling and transmits the enablement information to the terminal. If the value of the enablement information is "1", the terminal needs to determine uplink transmission power adjustment amounts on subframes which belong to different subframe groups, and if the value of the enablement information is not "1", the terminal needs not to determine uplink transmission power adjustment amounts on subframes which belong to different subframe groups.

In a preferable embodiment, the above base station further configures multiple sets of uplink power control signaling applied to different subframe groups, each set of uplink power control signaling being applied to one subframe group; and the base station transmits the multiple sets of uplink power control signaling applied to the different subframe groups to the terminal.

Wherein, each set of uplink power control signaling includes uplink open-loop power control parameters, the uplink open-loop power control parameters are used by the terminal to calculate the uplink transmission power of the terminal on the subframe, and the subframe is a subframe in the subframe group to which the uplink power control signaling is applied.

A base station which performs the above uplink power control method, as shown in FIG. 2, comprises a subframe group information determination module 204 and a transmission module 205, wherein, the subframe group information determination module 204 is configured to determine subframe group information;

the transmission module 205 is configured to transmit the subframe group information to the terminal.

The above subframe group information is used by the terminal to determine uplink transmission power adjustment amounts on subframes which belong to different subframe groups. The grouping method and contents of the subframe groups are described above, and the description thereof will be omitted here.

In a preferable embodiment, the above subframe group information is further used by the terminal to judge whether to determine uplink transmission power adjustment amounts on subframes which belong to the different subframe groups.

In a preferable embodiment, the base station further comprises an enablement information configuration module 206;

the enablement information configuration module 206 is configured to configure the enablement information, and the transmission module 205 is further configured to transmit the enablement information to the terminal, the enablement information being used by the terminal to judge whether to determine uplink transmission power adjustment amounts on subframes which belong to the different subframe groups.

In a preferable embodiment, the base station further comprises an uplink power control signaling configuration module 207, configured to configure multiple sets of uplink power control signaling applied to different subframe groups, each set of uplink power control signaling being applied to one subframe group; wherein, the transmission module 205 is further configured to transmit the multiple sets of uplink power control signaling applied to the different subframe groups to the terminal.

Wherein, each set of uplink power control signaling includes uplink open-loop power control parameters, and the uplink open-loop power control parameters are used by the terminal to calculate the uplink transmission power of the terminal on the subframe, and the subframe is a subframe in the subframe group to which the uplink power control signaling is applied.

The uplink power control method according to the embodiments of the present document will be described in detail below for specific application examples.

Application Example One

Figure 4:
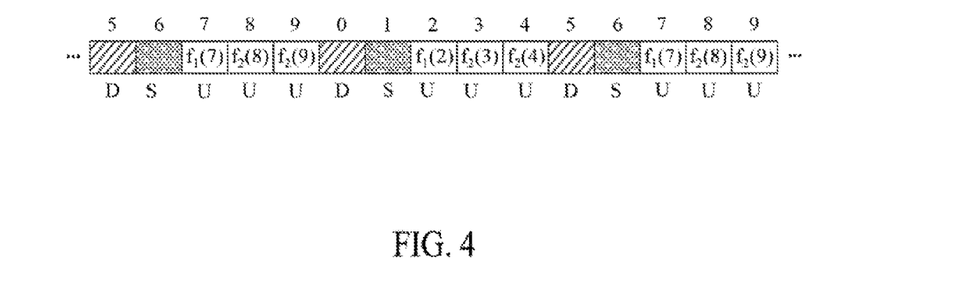
FIG. 4 is a diagram of a TDD configuration of a base station and uplink transmission power adjustment amount according to application examples one to three of the present document.

As shown in FIG. 4, assume that the base station uses a TDD uplink-downlink configuration 0 in table 1.

In the present example, the base station determines that the subframes 2 and 7 belong to the first subframe group, the subframes 3, 4, 8, and 9 belong to the second subframe group, and the base station divides the first subframe group and the second subframe group by using the following mode.

The base station acquires the TDD uplink-downlink configuration information of other base stations whose distance from the base station are less than a preset value, and judges that the subframes 2 and 7 in the TDD uplink-downlink configuration of these base stations are uplink transmission subframes, and for the subframes 3, 4, 8 and 9, there are certain one or more base stations to configure them as downlink transmission subframes. Then the base station determines that subframes 2 and 7 belong to the first subframe group and subframes 3, 4, 8 and 9 belong to the second subframe group; wherein the preset value can be configured by the base station or the system;

or the base station acquires information about interference conditions to which it is subjected on the various uplink subframes, and judges that the interference to which it is subjected on the subframes 2 and 7 is less than a preset threshold, and the interference to which it is subjected on the subframes 3, 4, 8 and 9 is larger than a preset threshold. Then the base station determines that subframes 2 and 7 belong to the first subframe group and subframes 3, 4, 8 and 9 belong to the second subframe group; wherein the preset threshold can be configured by the base station or the system.

The base station transmits the subframe group information to the terminal, and the terminal receives the subframe group information transmitted by the base station.

If the terminal receives the subframe group information transmitted by the base station, the terminal judges that it needs to determine the uplink transmission power adjustment amounts on the subframes which belong to different subframe groups.

Or the base station also configures enablement information (fore example, through the RRC signaling configuration), and transmits the enablement information to the terminal; the terminal receives the enablement information transmitted by the base station, and judges whether to determine uplink transmission power adjustment amounts on subframes which belong to the different subframe groups. For example, if the value of the enablement information is "1", the terminal needs to determine uplink transmission power adjustment amounts on subframes which belong to different subframe groups, and if the value of the enablement information is not "1", the terminal needs not to determine uplink transmission power adjustment amounts on subframes which belong to different subframe groups.

Wherein, whether the terminal determines uplink transmission power adjustment amounts on subframes which belong to different subframe groups refers to whether the terminal considers the subframe group information when determining the uplink transmission power adjustment amounts on the subframes.

The terminal determines which subframe group a subframe belongs to according to the received subframe group information.

The terminal determining uplink transmission power adjustment amounts on the subframes which belong to the different subframe groups specifically comprises: the terminal receiving power adjustment signaling transmitted by the base station, and determining the uplink transmission power adjustment amounts on the subframes which belong to the different subframe groups according to the adjustment values corresponding to the power adjustment signaling and subframe group information.

Wherein, the power adjustment signaling refers to uplink Transmit Power Control (TPC) command, and the adjustment values corresponding to the power adjustment signaling include accumulative adjustment values or absolute adjustment values;

if the adjustment values corresponding to the TPC command are accumulative adjustment values, the terminal determining the uplink transmission power adjustment amounts on the subframes which belong to the different subframe groups according to adjustment values corresponding to the TPC command and subframe group information specifically comprises:

by taking a subframe 2 as an example, which belongs to the first subframe group, the terminal determining that uplink transmission power adjustment amount on the subframe 2 is a sum of the uplink transmission power adjustment amount of the terminal on the latest subframe which is prior to the subframe 2 and belongs to the same subframe group as that of the subframe 2 (i.e., the subframe 7 in last radio frame) and the accumulative adjustment value corresponding to the TPC command, i.e., $$f_1(2)=f_1(7)+\delta \text{ [dB]}$$

wherein, $f_1(2)$ represents the uplink transmission power adjustment amount on the subframe 2 determined by the terminal, $f_1(7)$ represents the uplink transmission power adjustment amount of the terminal on the subframe 7, and $\delta$ represents the accumulative adjustment value corresponding to TPC command for the subframe 2 transmitted by the base station and received by the terminal, wherein the subscript 1 represents the index of a subframe group, i.e., the subframes 2 and 7 belong to the first subframe group;

by taking a subframe 3 as an example, which belongs to the second subframe group, the terminal determining that uplink transmission power adjustment amount on the subframe 3 is a sum of the uplink transmission power adjustment amount of the terminal on the latest subframe which is prior to the subframe 3 and belongs to the same subframe group as that of the subframe 3 (i.e. the subframe 9 in last radio frame) and the accumulative adjustment value corresponding to the TPC command, i.e., $$f_2(3)=f_2(9)+\delta \text{ [dB]}$$

wherein, $f_2(3)$ represents the uplink transmission power adjustment amount on the subframe 3 determined by the terminal, $f_2(9)$ represents the uplink transmission power adjustment amount of the terminal on the subframe 9, and $\delta$ represents the accumulative adjustment value corresponding to TPC command for the subframe 3 transmitted by the base station and received by the terminal, wherein the subscript 2 represents the index of a subframe group, i.e., the subframes 3 and 9 belong to the second subframe group;

if the adjustment values corresponding to the TPC command are absolute adjustment values, and the operation of the terminal determining the uplink transmission power adjustment amounts on the subframes which belong to the different subframe groups according to adjustment values corresponding to the TPC command and subframe group information comprises:

by taking a subframe 2 as an example, which belongs to the first subframe group, the terminal determining that uplink transmission power adjustment amount on the subframe 2 is the absolute adjustment value corresponding to the TPC command, i.e., $$f_1(2)=\delta \text{ [dB]}$$

wherein, $f_1(2)$ represents the uplink transmission power adjustment amount on the subframe 2 determined by the terminal, and $\delta$ represents the absolute adjustment value corresponding to TPC command for the subframe 2 transmitted by the base station and received by the terminal wherein the subscript 1 represents the index of a subframe group, i.e., the subframe 2 belongs to the first subframe group;

by taking subframe 3 as an example, which belongs to the second subframe group, the terminal determining that uplink transmission power adjustment amount on the subframe 3 is the absolute adjustment value corresponding to the TPC command, i.e., $$f_2(3)=\delta \text{ [dB]}$$

wherein, $f_2(3)$ represents the uplink transmission power adjustment amount on the subframe 3 determined by the terminal, and $\delta$ represents the absolute adjustment value corresponding to TPC command for the subframe 3 transmitted by the base station and received by the terminal, wherein the subscript 2 represents the index of a subframe group, i.e., the subframe 3 belongs to the second subframe group.

The terminal determines uplink transmission power on corresponding subframes according to the determined uplink transmission power adjustment amounts on the subframes which belong to the different subframe groups.

By taking a subframe 2 as an example, according to the 3GPP TS 36.213, for the physical uplink shared channel, the terminal determines that uplink transmission power of it on the subframe 2 is $$P(2)=10\log_{10}(M(2))+P_O+\alpha \cdot PL+\Delta_{TF}(2)+f_1(2) \text{ [dBm]}$$

wherein, $P(2)$ represents uplink transmission power of the terminal on the subframe 2, $M(2)$ represents the transmission resource bandwidth of the terminal on the subframe 2, $P_O$ represents the power parameter configured by the system, $\alpha$ represents the path loss compensation factor configured by the system, PL represents the downlink path loss estimated by the terminal, $\Delta_{TF}(2)$ represents the transmission compensation amount of the terminal on the subframe 2, and $f_1(2)$ represents the uplink transmission power adjustment amount on the subframe 2 determined by the terminal, wherein the subscript 1 represents the index of a subframe group, i.e., the subframe 2 belongs to the first subframe group;

By taking subframe 3 as an example, according to the 3GPP TS 36.213, for the physical uplink shared channel, the terminal determines that uplink transmission power of its own on the subframe 3 is $$P(3)=10\log_{10}(M(3))+P_O+\alpha \cdot PL+\Delta_{TF}(3)+f_2(3) \text{ [dBm]}$$

wherein, P(3) represents uplink transmission power of the terminal on the subframe 3, M(3) represents the transmission resource bandwidth of the terminal on the subframe 3, $P_O$ represents the power parameter configured by the system, α represents the path loss compensation factor configured by the system, PL represents the downlink path loss estimated by the terminal, $\Delta_{TF}$ (3) represents the transmission compensation amount on the subframe 3 of the terminal, and $f_2$(3) represents the uplink transmission power adjustment amount on the subframe 3 determined by the terminal, wherein the subscript 2 represents the index of a subframe group, i.e., the subframe 3 belongs to the second subframe group.

Application Example Two

As shown in FIG. 4, assume that the base station uses a TDD uplink-downlink configuration 0 in table 1.

In the present example, similarly to the application example one, the base station determines that the subframes 2 and 7 belong to the first subframe group, and the subframes 3, 4, 8, and 9 belong to the second subframe group.

The base station transmits the subframe group information to the terminal, and the terminal receives the subframe group information transmitted by the base station.

The terminal judges whether to determine the uplink transmission power adjustment amounts on the subframes which belong to different subframe groups, which is the same as that of the application example one.

The terminal determines which subframe group a subframe belongs to according to the received subframe group information.

The terminal determines uplink transmission power adjustment amounts on the subframes which belong to the different subframe groups, and the specific operation process is the same as that of the application example one.

In the present example, the base station further configures multiple sets of uplink power control signaling applied to different subframe groups, i.e., the base station configures two sets of uplink power control signaling, which are applied to the first subframe group and the second subframe group respectively; and the base station transmits the two sets of uplink power control signaling to the terminal.

The above two sets of uplink power control signaling comprise uplink open-loop power control parameters, which are used by the terminal to calculate the uplink transmission power of the terminal on the subframe which belongs to the first subframe group and the uplink transmission power of the terminal on the subframe which belongs to the second subframe group.

The terminal receives the two sets of uplink power control signaling transmitted by the base station which are applied to the first subframe group and the second subframe group respectively.

The terminal determining the uplink transmission power of the terminal on corresponding subframes according to the determined uplink transmission power adjustment amounts in combination with the received uplink power control signaling specifically comprises:

when determining the uplink transmission power on one subframe, the terminal calculating the uplink transmission power on the subframe by using the uplink open-loop power control parameters in the uplink power control signaling which is applied to the subframe group to which the subframe belongs, and adjusting the calculated uplink transmission power using the determined uplink transmission power adjustment amount of the terminal on the subframe, By taking a subframe 2 as an example, according to the 3GPP TS 36.213, for the physical uplink shared channel, the terminal determines that uplink transmission power of its own on the subframe 2 is $$P(2)=10\log_{10}(M(2))+P_{O,1}+\alpha_1 \cdot PL+\Delta_{TF}(2)+f_1(2)$$
[dBm]

wherein, P(2) represents uplink transmission power of the terminal on the subframe 2, M(2) represents the transmission resource bandwidth of the terminal on the subframe 2, $P_{O,1}$ represents the power parameter configured by the base station applied to the first subframe group, $\alpha_1$ represents the path loss compensation factor configured by the base station applied to the first subframe group, PL represents the downlink path loss estimated by the terminal, $\Delta_{TF}$ (2) represents the transmission compensation amount on the subframe 2 of the terminal, and $f_1$(2) represents the uplink transmission power adjustment amount on the subframe 2 determined by the terminal, wherein the subscript 1 represents the index of a subframe group, i.e., the subframe 2 belongs to the first subframe group, and $P_{O,1}$ and $\alpha_1$ are uplink open-loop power control parameters in the set of uplink power control signaling applied to the first subframe group.

By taking subframe 3 as an example, according to the 3GPP TS 36.213, for the physical uplink shared channel, the terminal determines that uplink transmission power of its own on the subframe 3 is $$P(3)=10\log_{10}(M(3))+P_{O,2}+\alpha_2 \cdot PL+\Delta_{TF}(3)+f_2(3)$$
[dBm]

wherein, P(3) represents uplink transmission power of the terminal on the subframe 3, M(3) represents the transmission resource bandwidth of the terminal on the subframe 3, $P_{O,2}$ represents the power parameter configured by the base station applied to the second subframe group, $\alpha_2$ represents the path loss compensation factor configured by the base station applied to the second subframe group, PL represents the downlink path loss estimated by the terminal, $\Delta_{TF}$(3) represents the transmission compensation amount of the terminal on the subframe 3, and $f_2$(3) represents the uplink transmission power adjustment amount on the subframe 3 determined by the terminal, wherein the subscript 2 represents the index of a subframe group, i.e., the subframe 3 belongs to the second subframe group, and $P_{O,2}$ and $\alpha_2$ are uplink open-loop power control parameters in the set of uplink power control signaling applied to the second subframe group.

Application Example Three

As shown in FIG. 4, assume that the base station uses a TDD uplink-downlink configuration 0 in table 1.

In the present example, similarly to the application example one, the base station determines that the subframes 2 and 7 belong to the first subframe group, and the subframes 3, 4, 8, and 9 belong to the second subframe group.

The base station transmits the subframe group information to the terminal, and the terminal receives the subframe group information transmitted by the base station.

The terminal judges whether to determine the uplink transmission power adjustment amounts on the subfames which belong to different subframe groups, which is the same as that of the application example one.

The terminal determines which subframe group a subframe belongs to according to the received subframe group information.

The terminal determining uplink transmission power adjustment amounts on the subframes which belong to the different subframe groups specifically comprises: the terminal receiving power adjustment signaling transmitted by the base station, and determining the uplink transmission power adjustment amounts on the subframes which belong to the different subframe groups according to adjustment values corresponding to the power adjustment signaling and subframe group information.

Wherein, the power adjustment signaling refers to uplink Transmit Power Control (TPC) command, and the adjustment values corresponding to the power adjustment signaling include accumulative adjustment values or absolute adjustment values;

In the present example, the base station configures the TPC command for each group of uplink subframes with a period of 10 ms (the time length of one radio frame) and transmits the TPC command to the terminal.

Assume that the base station configures the TPC command for first uplink subframes in one radio frame which belong to different subframe groups and transmits the TPC command to the terminal, i.e., the base station configures the TPC command for the subframe 2 in one radio frame which belongs to the first subframe group and transmits the TPC command to the terminal, and the base station configures the TPC command for the subframe 3 in one radio frame which belongs to the second subframe group and transmits the TPC command to the terminal; for other uplink subframes, the base station does not configure and transmit the TPC command.

Then, if the adjustment values corresponding to the TPC command are accumulative adjustment values, and by taking the subframes 2 and 7 which belong to the first subframe group as an example, the terminal determining the uplink transmission power adjustment amounts on the subframes which belong to the first subframe group according to adjustment values corresponding to the TPC command and subframe group information specifically comprises:

the terminal determining that uplink transmission power adjustment amount on a subframe 2 is a sum of the uplink transmission power adjustment amount of the terminal on the latest subframe which is prior to the subframe 2 and belongs to the same subframe group as that of the subframe 2 (i.e. the subframe 7 in last radio frame) and the accumulative adjustment value corresponding to the TPC command, i.e., $$f_1(2)=f_1(7)+\delta \text{ [dB]}$$

wherein, $f_1(2)$ represents the uplink transmission power adjustment amount on the subframe 2 determined by the terminal, $f_1(7)$ represents the uplink transmission power adjustment amount of the terminal on the subframe 7, and $\delta$ represents the accumulative adjustment value corresponding to the TPC command for the subframe 2 transmitted by the base station and received by the terminal, the subscript 1 represents the index of a subframe group, i.e., the subframes 2 and 7 belong to the first subframe group.

As the base station does not configure and transmit the TPC command for the subframe 7, the terminal assumes that the accumulative adjustment value corresponding to the TPC command for the subframe 7 is 0 dB. Then, the terminal determining that uplink transmission power adjustment amount on a subframe 7 is a sum of the uplink transmission power adjustment amount of the terminal on the latest subframe which is prior to the subframe 7 and belongs to the same subframe group as that of the subframe 7 (i.e. the subframe 2 in the same radio frame with the subframe 7) and the accumulative adjustment value corresponding to the TPC command, i.e., $$f_1(7)=f_1(2)+0 \text{ [dB]}, \text{ i.e. } f_1(7)=f_1(2) \text{ [dB]}$$

wherein, $f_1(7)$ represents the uplink transmission power adjustment amount on the subframe 7 determined by the terminal, $f_1(2)$ represents the uplink transmission power adjustment amount of the terminal on the subframe 2, 0 represents that the accumulative adjustment value corresponding to the TPC command for the subframe 7 assumed by the terminal is 0 dB, and the subscript 1 represents the index of a subframe group, i.e., the subframes 2 and 7 belong to the first subframe group.

If the adjustment values corresponding to the TPC command are absolute adjustment values, and by taking the subframes 2 and 7 which belong to the first subframe group as an example, the terminal determining the uplink transmission power adjustment amounts on the subframes which belong to the first subframe group according to adjustment amounts corresponding to the TPC command and subframe group information specifically comprises:

the terminal determining that uplink transmission power adjustment amount on a subframe 2 is the absolute adjustment value corresponding to the TPC command, i.e., $$f_1(2)=\delta \text{ [dB]}$$

wherein, $f_1(2)$ represents the uplink transmission power adjustment amount on the subframe 2 determined by the terminal, and $\delta$ represents the absolute adjustment value corresponding to the TPC command for the subframe 2 transmitted by the base station and received by the terminal, and the subscript 1 represents the index of a subframe group, i.e., the subframe 2 belongs to the first subframe group.

As the base station does not configure and transmit the TPC command for the subframe 7, the terminal determining that uplink transmission power adjustment amount on a subframe 7 is uplink transmission power adjustment amount of the terminal on the latest subframe which is prior to the subframe 7 and belongs to the same subframe group as that of the subframe 7 (i.e. the subframe 2 in the same radio frame with the subframe 7), i.e., $$f_1(7)=f_1(2) \text{ [dB]}$$

wherein, $f_1(7)$ represents the uplink transmission power adjustment amount on the subframe 7 determined by the terminal, $f_1(2)$ represents the uplink transmission power adjustment amount of the terminal on the subframe 2, wherein the subscript 1 represents the index of a subframe group, i.e., the subframes 2 and 7 belong to the first subframe group.

The terminal determines uplink transmission power on corresponding subframes according to the determined uplink transmission power adjustment amounts on the subframes which belong to the different subframe groups, which is the same as that of the application example one.

A person having ordinary skill in the art should understand that all or a part of the steps in the above method can be implemented by programs instructing related hardware, and the programs can be stored in a computer readable storage medium, such as a read-only memory, a disk, or a disc. Alternatively, all or a part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

Of course, the present document can have a plurality of other embodiments. For those skilled in the art, various corresponding variations and alternatives can be made according to the present document without departing from the spirit and substance of the present document, and all these corresponding variations and alternatives should belong to the protection scope of appended claims of the present document.

INDUSTRIAL APPLICABILITY

The embodiments of the present document enable the terminal to perform uplink transmission with a suitable uplink transmission power by adjusting or determining uplink transmission power of the terminal on subframes which belong to different subframe groups respectively, which ensures the SINR requirements on the uplink transmission by the terminal on the uplink subframes which belong to different subframe groups as much as possible, thereby ensuring the uplink transmission performance of the terminal and the system.

What is claimed is:

1. An uplink power control method, comprising:
  a terminal receiving subframe group information transmitted by a base station, and determining which subframe group a subframe belongs to according to the subframe group information, wherein the subframe group information comprises grouping information of the uplink subframes in one or more radio frames or information about which subframe group one uplink subframe belongs to;
  the terminal determining uplink transmission power adjustment amounts on subframes which belong to different subframe groups respectively, and
  the terminal determining uplink transmission power on corresponding subframes according to determined uplink transmission power adjustment amounts on the subframes which belong to the different subframe groups.

2. The method according to claim 1, further comprising:
  the terminal judging, according to whether the subframe group information transmitted by the base station is received, whether to perform the step of determining uplink transmission power adjustment amounts on subframes which belong to the different subframe groups, or the terminal judging, according to enablement information transmitted by the base station, whether to perform the step of determining uplink transmission power adjustment amounts on subframes which belong to the different subframe groups.

3. The method according to claim 1, wherein,
  the terminal determining uplink transmission power adjustment amounts on the subframes which belong to the different subframe groups comprises:
  the terminal receiving power adjustment signaling transmitted by a base station, and determining the uplink transmission power adjustment amounts on the subframes which belong to the different subframe groups according to adjustment values corresponding to the power adjustment signaling and subframe group information; wherein
  the power adjustment signaling transmitted by the base station comprises uplink transmit power control (TPC) command.

4. The method according to claim 3, wherein, the adjustment values corresponding to the power adjustment signaling are accumulative adjustment values or absolute adjustment values, when the adjustment values corresponding to the power adjustment signaling are accumulative adjustment values, the terminal determining the uplink transmission power adjustment amounts on the subframes which belong to the different subframe groups according to adjustment values corresponding to the power adjustment signaling and subframe group information comprises:
  the terminal determining that the uplink transmission power adjustment amount on the subframe k is a sum of the uplink transmission power adjustment amount of the terminal on the latest subframe which is prior to the subframe k and belongs to the same subframe group as that of the subframe k and the accumulative adjustment value corresponding to the power adjustment signaling, i.e., $$f_N(k)=f_N(i)+\delta \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i, and δ represents the accumulative adjustment value corresponding to power adjustment signaling for the subframe k transmitted by the base station and received by the terminal;

when the adjustment values corresponding to the power adjustment signaling are absolute adjustment values, the terminal determining the uplink transmission power adjustment amounts on the subframes which belong to the different subframe groups according to the adjustment values corresponding to the power adjustment signaling and subframe group information comprises:
  the terminal determining that the uplink transmission power adjustment amount on the subframe k is the absolute adjustment value corresponding to the power adjustment signaling, i.e., $$f_N(k)=\delta \text{ [dB]}$$

wherein, k represents the index of a subframe, N represents the index of the subframe group which the subframe k belongs to, the number of subframe groups is larger than or equal to 2, $f_N(k)$ represents the uplink transmission power adjustment amount on the subframe k determined by the terminal, and δ represents the absolute adjustment value corresponding to power adjustment signaling for the subframe k transmitted by the base station and received by the terminal.

5. The method according to claim 3, wherein,
  the terminal does not receive the power adjustment signaling for the subframe k, the terminal determining that the uplink transmission power adjustment amount on the subframe k is the uplink transmission power adjustment amount on the latest subframe which is prior to subframe k and belongs to the same subframe group as that of the subframe k, i.e., $$f_N(k)=f_N(i) \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i.

6. The method according to claim 1, wherein, before determining the uplink transmission power, the method further comprises: the terminal receiving multiple sets of uplink power control signaling applied to different subframe groups which are transmitted by the base station, each set of uplink power control signaling comprising uplink open-loop power control parameters and being applied to one subframe group; and the terminal determining uplink transmission power on corresponding subframes according to the determined uplink transmission power adjustment amounts on the subframes which belong to the different subframe groups comprises: the terminal determining the uplink transmission power of corresponding subframes according to the determined uplink transmission power adjustment amounts in combination with the received multiple sets of uplink power control signaling applied to different subframe groups;

the terminal calculating the uplink transmission power on a subframe according to the following equation:

$$P(k)=10\log_{10}(M(k))+P_{O,N}+\alpha_N \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the current subframe k, M(k) represents the transmission resource bandwidth of the terminal, $P_{O,N}$ and $\alpha_N$ are uplink open-loop power control parameters in the uplink power control signaling applied to the subframe group N to which the subframe k belongs, wherein, $P_{O,N}$ represents the power parameter configured by the system applied to the subframe group N, $\alpha_N$ represents the path loss compensation factor configured by the system applied to the subframe group N, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

7. The method according to claim 1, wherein, the terminal determining uplink transmission power on corresponding subframes according to the determined uplink transmission power adjustment amounts on the subframes which belong to the different subframe groups comprises:

the terminal calculating the uplink transmission power on a subframe according to the following equation:

$$P(k)=10\log_{10}(M(k))+P_O+\alpha \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M(k) represents the transmission resource bandwidth of the terminal, $P_O$ represents the power parameter configured by the system, $\alpha$ represents the path loss compensation factor configured by the system, PL represents the downlink path loss estimated by the terminal, $\Delta_{TF}(k)$ represents the transmission compensation amount of the terminal, and $f_N(k)$ represents the uplink transmission power adjustment amount on the subframe k determined by the terminal.

8. An uplink power control method, comprising:

a base station determining subframe group information, and transmitting the subframe group information to the terminal;

wherein, the subframe group information comprises grouping information of the uplink subframes in one or more radio frames or information about which subframe group one uplink subframe belongs to and is used by a terminal to determine which subframe group a subframe belongs to and determine uplink transmission power adjustment amounts on subframes which belong to different subframe groups respectively.

9. The method according to claim 8, further comprising:

the base station configuring enablement information, and transmitting the enablement information to the terminal, wherein, the enablement information is used by the terminal to judge whether to determine uplink transmission power adjustment amounts on subframes which belong to the different subframe groups.

10. The method according to claim 8, the method further comprising:

the base station configuring multiple sets of uplink power control signaling applied to different subframe groups, each set of uplink power control signaling comprising uplink open-loop power control parameters and being applied to one subframe group; and the base station transmitting the multiple sets of uplink power control signaling applied to the different subframe groups to the terminal;

the uplink open-loop power control parameters in each set of uplink power control signaling are used by the terminal to calculate the uplink transmission power of the terminal on the subframe, and the subframe is a subframe in the subframe group to which the uplink power control signaling is applied.

11. A terminal for implementing uplink power control, comprising a power adjustment amount determination module and a transmission power determination module, wherein, the power adjustment amount determination module is configured to receive subframe group information transmitted by a base station, and determine which subframe group a subframe belongs to according to the subframe group information, wherein the subframe group information comprises grouping information of the uplink subframes in one or more radio frames or information about which subframe group one uplink subframe belongs to; and determine uplink transmission power adjustment amounts on subframes which belong to different subframe groups respectively, and the transmission power determination module is configured to determine uplink transmission power on corresponding subframes according to the uplink transmission power adjustment amounts on the subframes which belong to the different subframe groups determined by the power adjustment amount determination module.

12. The terminal according to claim 11, wherein, the power adjustment amount determination module is further configured to judge, according to whether the subframe group information transmitted by the base station is received, whether to determine uplink transmission power adjustment amounts on subframes which belong to the different subframe groups, or the power adjustment amount determination module is further configured to judge, according to enablement information transmitted by the base station, whether to determine uplink transmission power adjustment amounts on subframes which belong to the different subframe groups.

13. The terminal according to claim 11, wherein,
the power adjustment amount determination module is configured to determine uplink transmission power adjustment amounts on the subframes which belong to the different subframe groups respectively in the following way:
receiving power adjustment signaling transmitted by a base station, and determining the uplink transmission power adjustment amounts on the subframes which belong to the different subframe groups according to adjustment values corresponding to the power adjustment signaling and the subframe group information; wherein
the power adjustment signaling comprises uplink transmit power control (TPC) command.

14. The terminal according to claim 13, wherein, the adjustment values corresponding to the power adjustment signaling are accumulative adjustment values or absolute adjustment values,
when the adjustment values corresponding to the power adjustment signaling are accumulative adjustment values, the power adjustment amount determination module is configured to determine the uplink transmission power adjustment amounts on the subframes which belong to the different subframe groups according to adjustment values corresponding to the power adjustment signaling and subframe group information in the following way:
determining that the uplink transmission power adjustment amount on the subframe k is a sum of the uplink transmission power adjustment amount of the terminal on the latest subframe which is prior to the subframe k and belongs to the same subframe group as that of the subframe k and the accumulative adjustment value corresponding to the power adjustment signaling, i.e., $$f_N(k)=f_N(i)+\delta \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i, and $\delta$ represents the accumulative adjustment value corresponding to power adjustment signaling for the subframe k transmitted by the base station and received by the terminal;
when the adjustment values corresponding to the power adjustment signaling are absolute adjustment values, the power adjustment amount determination module is configured to determine the uplink transmission power adjustment amounts on the subframes which belong to the different subframe groups according to the adjustment values corresponding to the power adjustment signaling and subframe group information in the following way;

determining that the uplink transmission power adjustment amount on the subframe k is the absolute adjustment value corresponding to the power adjustment signaling, i.e., $$f_N(k)=\delta \text{ [dB]}$$

wherein, k represents the index of a subframe, N represents the index of the subframe group which the subframe k belongs to, the number of subframe groups is larger than or equal to 2, $f_N(k)$ represents the uplink transmission power adjustment amount on the subframe k determined by the terminal, and $\delta$ represents the absolute adjustment value corresponding to power adjustment signaling for the subframe k transmitted by the base station and received by the terminal.

15. The terminal according to claim 13, wherein,
the power adjustment amount determination module does not receive the power adjustment signaling for the subframe k, the power adjustment amount determination module determining that the uplink transmission power adjustment amount on the subframe k is the uplink transmission power adjustment amount on the latest subframe which is prior to subframe k and belongs to the same subframe group as that of the subframe k, i.e., $$f_N(k)=f_N(i) \text{ [dB]}$$

wherein, k represents the index of a subframe, N represents the index of the subframe group which the subframe k belongs to, the number of subframe groups is larger than or equal to 2, i represents the index of the latest subframe which is prior to the subframe k and belongs to the subframe group N, $f_N(k)$ represents the uplink transmission power adjustment amount on the subframe k determined by the terminal, $f_N(i)$ represents the uplink transmission power adjustment amount of the terminal on subframe i.

16. The terminal according to claim 1, wherein,
the terminal further comprising a control signaling reception module, configured to receive multiple sets of uplink power control signaling applied to different subframe groups which are transmitted by the base station, each set of uplink power control signaling comprising uplink open-loop power control parameters and being applied to one subframe group; and
the transmission power determination module is configured to determine uplink transmission power on corresponding subframes according to the uplink transmission power adjustment amounts on the subframes which belong to the different subframe groups determined by the power adjustment amount determination module by: determining the uplink transmission power of corresponding subframes according to the uplink transmission power adjustment amounts determined by the power adjustment amount determination module in combination with the multiple sets of uplink power control signaling received by the control signaling reception module;
the transmission power determination module is configured to calculate the uplink transmission power on a subframe according to the following equation:

$$P(k)=10 \log_{10}(M(k))+P_{O,N}+\alpha_N \cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M(k) represents the transmission resource bandwidth of the terminal, $P_{O,N}$ and $\alpha_N$ are uplink open-loop power control parameters in the uplink power control signaling applied to the subframe group N to which the subframe k belongs, wherein, $P_{O,N}$ represents the power parameter configured by the system applied to the subframe group N, $\alpha_N$ represents the path loss compensation factor configured by the system applied to the subframe group N, PL represents the downlink path loss estimated by the terminal, $\Delta_{TF}$ (k) represents the transmission compensation amount of the terminal, and $f_N(k)$ represents the uplink transmission power adjustment amount on the subframe k determined by the terminal.

17. The terminal according to claim 11, wherein, the transmission power determination module is configured to calculate the uplink transmission power on a subframe according to the following equation:

$$P(k)=10\log_{10}(M(k))+P_O+\alpha\cdot PL+\Delta_{TF}(k)+f_N(k) \text{ [dBm]}$$

wherein, k represents the index of a subframe, N represents the index of the subframe group which the subframe k belongs to, the number of subframe groups is larger than or equal to 2, P(k) represents the uplink transmission power of the terminal on the subframe k, M(k) represents the transmission resource bandwidth of the terminal, $P_O$ represents the power parameter configured by the system, $\alpha$ represents the path loss compensation factor configured by the system, PL represents the downlink path loss estimated by the terminal, $\Delta_{TF}$ (k) represents the transmission compensation amount of the terminal, and $f_N(k)$ represents the uplink transmission power adjustment amount on the subframe k determined by the terminal.

18. A base station for implementing uplink power control, comprising a subframe group information determination module and a transmission module, wherein, the subframe group information determination module is configured to determine subframe group information; and the transmission module is configured to transmit the subframe group information to the terminal;

wherein, the subframe group information comprises grouping information of the uplink subframes in one or more radio frames or information about which subframe group one uplink subframe belongs to and is used by a terminal to determine which subframe group a subframe belongs to and determine uplink transmission power adjustment amounts on subframes which belong to different subframe groups respectively.

19. The base station according to claim 18, wherein, the base station further comprises an enablement information configuration module, configured to configure the enablement information, wherein, the enablement information is used by the terminal to judge whether to determine uplink transmission power adjustment amounts on subframes which belong to the different subframe groups, and the transmission module is further configured to transmit the enablement information to the terminal.

20. The base station according to claim 18, further comprising:

an uplink power control signaling configuration module, configured to configure multiple sets of uplink power control signaling applied to different subframe groups, each set of uplink power control signaling comprising uplink open-loop power control parameters and being applied to one subframe group; and, the transmission module is further configured to transmit the multiple sets of uplink power control signaling applied to the different subframe groups to the terminal;

the uplink open-loop power control parameters in each set of uplink power control signaling are used by the terminal to calculate the uplink transmission power of the terminal on the subframe, and the subframe is an a subframe in the subframe group to which the uplink power control signaling is applied.

* * * * *